United States Patent [19]
Flotow

[11] Patent Number: 4,991,704
[45] Date of Patent: Feb. 12, 1991

[54] APPARATUS FOR ADJUSTING HYSTERESIS IN A CLUTCH

[75] Inventor: Richard A. Flotow, Butler, Ind.

[73] Assignee: Dana Corporation, Toledo, Ohio

[21] Appl. No.: 442,192

[22] Filed: Nov. 28, 1989

[51] Int. Cl.⁵ ............................................. F16D 03/14
[52] U.S. Cl. ............................ 192/106.1; 192/70.17; 464/68
[58] Field of Search ............... 192/106.1, 70.17, 70.16, 192/70.25, 110 R; 464/68

[56] References Cited

U.S. PATENT DOCUMENTS

| | | | |
|---|---|---|---|
| 1,896,914 | 2/1933 | Paton | 192/106.2 |
| 2,158,244 | 5/1939 | Mistretta et al. | 192/106.2 |
| 2,276,416 | 3/1942 | Nutt | 192/106.2 |
| 2,286,502 | 6/1942 | Newton | 192/106.2 |
| 4,101,015 | 7/1978 | Radke | 192/106.2 |
| 4,254,855 | 3/1981 | Hildebrand et al. | 192/106.2 |
| 4,485,908 | 12/1984 | Gatewood | 192/106.2 |
| 4,537,295 | 8/1985 | Fadler et al. | 192/106.2 |
| 4,553,655 | 11/1985 | Lech, Jr., et al. | 192/106.2 |
| 4,569,430 | 2/1986 | Raab et al. | 192/70.17 |
| 4,601,377 | 7/1986 | Flotow et al. | 192/110 R |
| 4,615,426 | 10/1986 | Lech, Jr. | 192/106.2 |
| 4,635,780 | 1/1987 | Wiggen | 192/70.17 |
| 4,640,402 | 2/1987 | Hartig et al. | 192/106.1 |
| 4,687,087 | 8/1987 | Tebbe | 192/106.1 |
| 4,715,485 | 12/1987 | Rostin et al. | 192/106.1 |
| 4,846,328 | 7/1989 | Fukushima | 192/106.1 |

Primary Examiner—Rodney H. Bonck
Assistant Examiner—Andrea Pitts
Attorney, Agent, or Firm—Marshall & Melhorn

[57] ABSTRACT

A clutch driven disc assembly includes a hub, a support plate and at least one reinforcing plate mounted on and rotatable relative to the hub, a plurality of circumferentially spaced fasteners connecting together said support plate and said reinforcing plate, and a coaxial spring damper. An apparatus for adjusting hysteresis in the damper includes a backing plate mounted on the hub with facing material abutting the fasteners for applying an axial load to the support plate. The load is selectively adjustable through a threaded locking nut and wave washer mounted on the hub. Segment facing material on the backing plate can be used to delay the application of the load. Camming surfaces on the facing material or on the fasteners can be used to gradually increase the load.

20 Claims, 3 Drawing Sheets 4,991,704

APPARATUS FOR ADJUSTING HYSTERESIS IN A CLUTCH

BACKGROUND OF THE INVENTION

The present invention relates generally to friction clutches for automotive vehicles and, in particular, to an apparatus for adjusting the hysteresis in a clutch damper.

In conventional passenger cars and trucks, objectional driveline vibrations may occur at certain speeds and road conditions. Some of these disturbances may be eliminated or reduced to an acceptable level with the incorporation of a torsional damper in the driven disc portion of the vehicle clutch. Damping is normally provided by a plurality of circumferentially spaced coil springs operatively connected between relatively rotatable elements of the clutch driven disc assembly.

Clutches with dampers are widely used in all types of power transmission systems. In recent years, particularly in the heavy duty field conventional spring dampers have not performed satisfactorily when used with the newer higher torque engines. Due to fuel efficiency considerations these engines operate at a lower speed range with fewer transmission speeds in a critical torsional range and, as a result, impose considerably higher torsional vibration loads on the spring damper than previous engines. This translates into greatly increased stresses on the damper spring which can increase damper spring failure. Additional clutch damage and rapid wear of the associated transmission input shaft and vehicle driveline components may follow.

One solution used to increase the torque capacity of heavy duty clutch driven disc assemblies has been to provide a two part cover designed to house a plurality of circumferentially spaced coaxial pairs of damper springs positioned in aligned openings formed in each cover part. The openings in one cover part engage the ends of both springs while the other cover part engages only the ends of one spring.

The above-described damper assemblies require a clutch assembly in which the outer covers and the hub rotate in unison and the disc and reinforcing plates with the springs rotate in unison relative thereto thus creating a load versus position curve. In some designs, certain additions between these two subassemblies will create hysteresis in the curve For example wave washers Belleville springs or even disc facing material can cause an hysteresis effect.

SUMMARY OF THE INVENTION

The present invention concerns an apparatus for adjusting the hysteresis in a clutch damper. The adjusting apparatus permits adjustment of a clutch damper load at an initial assembly to maintain constant hysteresis throughout the damper travel and readjustment after wear has occurred and the load has been reduced. A clutch driven disc assembly includes a support plate to which facing material is attached, and reinforcing plates which are riveted to the support plate for rotation as a unit with respect to a hub. The rivet heads are enlarged and machined to a selected height. A backing plate with facing material is abutted against the rivet heads by a wave washer or the like which applies an axial load. The load applied to the backing plate is adjustable by threading a locking nut onto the hub. A locking washer positioned between the nut and the wave washer has one tang which engages a keyway formed in the hub. A second tang on the locking washer engages a slot in the backing plate to prevent relative rotation between the hub and the backing plate.

In an alternate embodiment, the keyway in the hub can be formed wider than the associated tang on the locking washer to allow for a period of free travel before loading occurs. Another alternate embodiment incorporates a cam surface on either the rivet heads or the facing material to gradually increase the axial load during damping. A further alternate embodiment utilizes circumferentially spaced facing material segments to apply loading after a period of free travel. The heights of the rivet heads can be alternated and the thickness of the facing material increased in predetermined areas so that the shorter rivets will increase the load after a predetermined amount of relative rotation.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
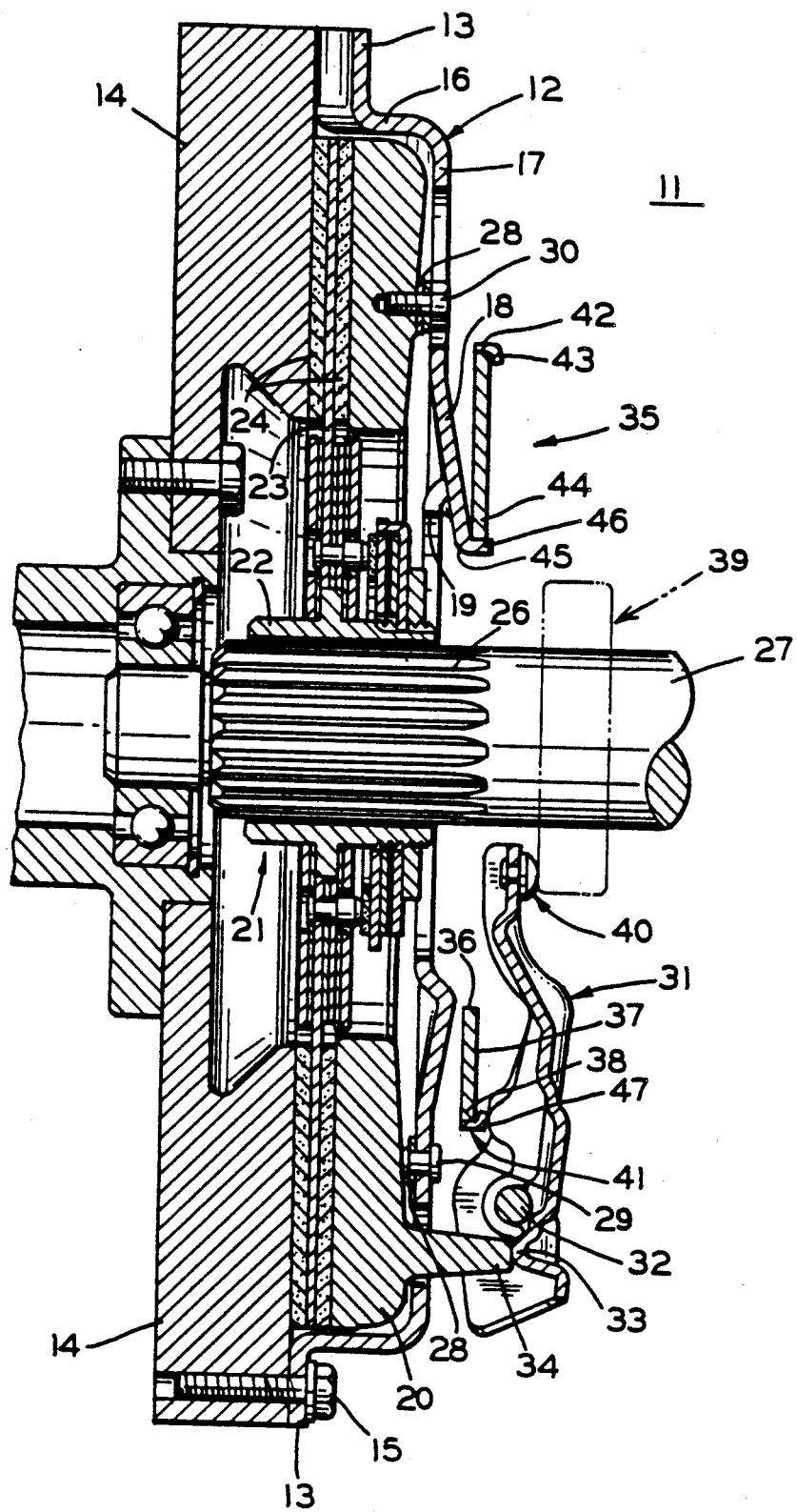
FIG. 1 is a cross-sectional view of a clutch incorporating an apparatus for adjusting hysteresis in accordance the present invention.

There is shown in FIG. 1 a cross-sectional view of a friction clutch 11 embodying an apparatus for adjusting damper hysteresis in accordance with the present invention. The clutch 11 includes an annular cover 12 which has a peripheral flange portion 13 extending in a generally radial direction. The flange portion 13 is attached to a rear face of a standard flywheel 14 by a plurality of circumferentially spaced bolts 15 such that the cover 12 rotates with the flywheel 14. The cover 12 also includes a rim portion 16 extending in a generally axial direction between the flange portion 13 and an end wall 17 extending radially inwardly from the rim portion 16 and terminating in an angularly disposed ramp 18. A radially inner portion of the ramp 18 defines a central opening 19 in the end wall 17. A pressure plate 20 is positioned between the flywheel 14 and an inner surface of the cover 12. A driven disc assembly 21 is adapted to be clamped between the flywheel 14 and the Pressure plate 20.

Figure 2:
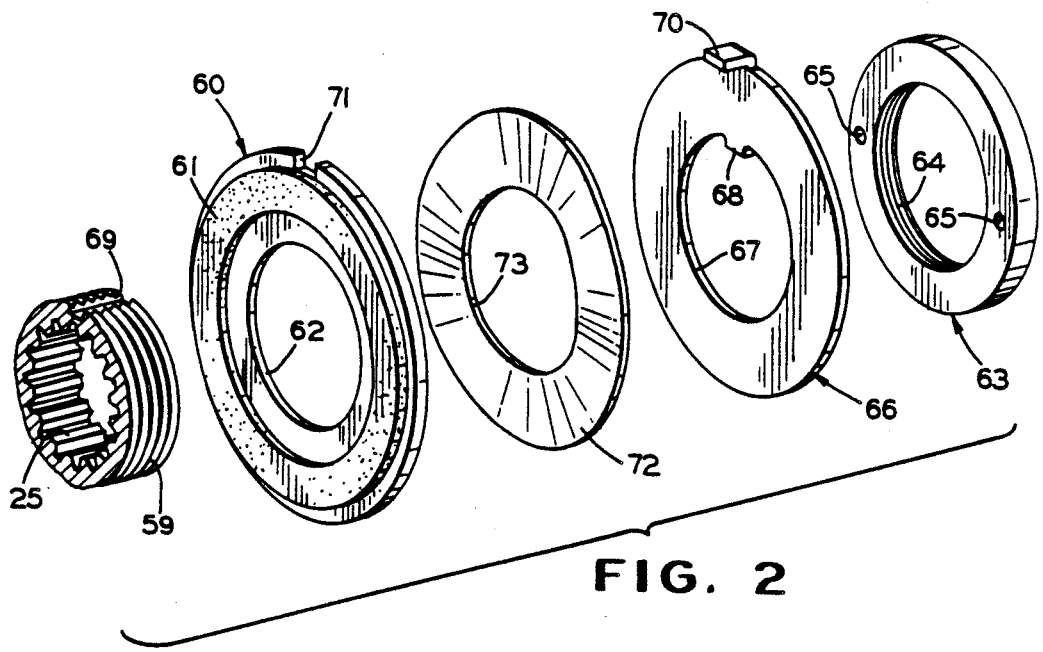
FIG. 2 is an exploded perspective view of a portion of the hub and apparatus shown in FIG. 1.
Figure 3:
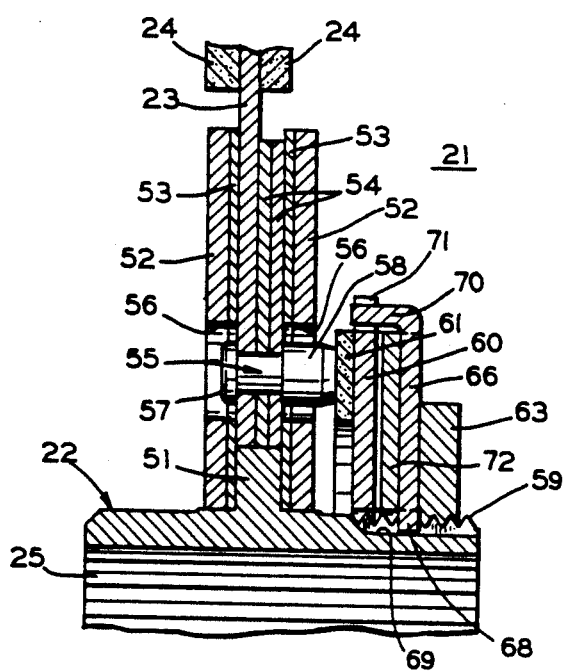
FIG. 3 is an enlarged fragmentary cross-sectional view of the driven disc assembly and adjusting apparatus shown in FIG. 1.

The driven disc assembly 21 is shown in more detail in FIGS. 2 and 3 and includes a central hub 22 extending through a support plate 23 secured thereto with friction material facings 24 fastened on opposite sides of the support plate 23. The hub 22 has a centrally formed aperture with internal splines 25 formed therein which cooperate with external splines 26 formed on an end of a transmission input shaft 27. The periphery of the support plate 23 and the friction facings 24 are thus positioned between the flywheel 14 and the pressure plate 20. The splined connection between the hub 22 and the input shaft 27 permits the driven disc assembly 21 to move freely in an axial direction relative to the input shaft 27 while being coupled for rotation with it. The pressure plate 20 is axially moveable into engagement with the driven disc assembly 21 to clamp the same against the flywheel 14 for drivingly connecting the rotatable drive and driven members of the clutch. A plurality of circumferentially spaced drive straps 28 rotatably connect the pressure plate 20 to the cover 12 and permit limited axial movement of the pressure plate 20 relative to the cover 12. The straps 28 further serve as a means to lift the pressure plate 20 away from the flywheel 14 when the clutch 11 is actuated to its disengaged position. The opposite ends of the drive straps 28 are connected by rivets 29 to the end wall 17 and by threaded fasteners 30 to the pressure plate 20.

A lever operating mechanism is provided to move the pressure plate 20 axially relative to the cover 12 and into and out of engagement with the driven disc 21. The lever operating mechanism is disposed wholly outside the cover 12, and includes a plurality of radially extending levers 31 pivotally connected to the cover 12 by pivot pins 32. Outer or tail ends 33 of each of levers 31 engage integral bosses 34 formed on the pressure plate 20.

Resilient means 35 are provided to apply an axial engaging force to the pressure plate 20 to normally urge the same into clamping engagement with the driven disc 21. The resilient means 35 is preferably designed to maintain a substantially constant pressure regardless of wear on the driven disc friction facing 24. In the preferred embodiment. the resilient means 35 is an annular Belleville spring compressed between the cover 12 and the levers 31. The Belleville spring 35 in its unstressed state is conical in shape, having an inner peripheral portion 36, an intermediate cone-shaped portion 37, and an outer peripheral portion 38. The inner and outer peripheral portions 36 and 38 are axially spaced and approach the same plane as the spring 35 is placed under compression, the spring being designed to have the fixed inner peripheral portion 36 react against the cover 12, and the moveable outer peripheral portion 38 engage and be moveable with the levers 31. Because of the spring movement the cover ramp 18 is angled to permit clearance during operation.

The levers 31 are arranged to be depressed against the action of the spring 35 by a throw out bearing 39 operating against inner or nose ends 40 of the levers 31. Operation of the throw out bearing 39 causes the levers 31 to pivot about the pins 32. The outer ends 33 respond by moving the pressure plate 20 clampingly against the driven disc assembly 21 to force the same against the flywheel 14.

To equally distribute load from the spring 35 to the levers 31, an annular collector ring 41 is provided. The collector ring 41 is cup-shaped in cross-section, and comprises an annular, axially extending rim 42 which encircles the outer peripheral portion 38 of the spring 35, and has a radially inwardly extending annular base 43. The base 43 is adapted to be positioned between the back face of the spring 35, and adjacent the front face of the levers 31. Thus, the base 43 is disposed for transferring the reaction load of the spring 35 to the levers 31, and is disposed at a slight angle to provide clearance for the outer peripheral portion 38 when the levers 31 are pivoted to their clutch disengaged position. The collector ring 41 has sufficient clearance with respect to the outer peripheral portion 38 to permit it to move freely during the various clutch operating stages. Since the levers 31 are in constant contact with the collector ring base 43, they serve to hold the collector ring 41 in place against the spring 35. If desired, the spring 35 may bear directly against the levers 31; however, an equal distribution of the load will result from employment of the annular collector ring 41.

The outer peripheral portion 38 of the spring 35 is encircled by the collector ring 41 as described. The inner peripheral portion 36 has a plurality of inwardly extending tongues 44 formed thereon. The tongues 44 are uniformly spaced apart, each tongue 44 extending into a corresponding recess 45 which in turn extends inwardly from the ramp 18. Each recess 45 has sidewalls (not shown), and a lip 46 for a secure non-slipping engagement of the inner peripheral portion 36 of the spring 35 and the cover 12. The operation of the clutch described is that of a conventional "push-type" clutch. Thus, in the normally engaged position of the clutch, the tongues 44 of the spring 35 will react in the recesses 45 of the cover 12. The outer periphery 38 of the spring 35 will urge the collector ring 41 axially outwardly against intermediate noses 47 of the levers 31. The levers 31 will then pivot about the pins 32 and the outer ends 33 will exert an axially inward force against the pressure plate 20 through the pressure plate bosses 34.

To disengage the clutch, an operator will typically depress a clutch pedal with his left foot. This action will cause the throw out bearing 39 to move axially inwardly against the inner ends or noses 40 of the levers 31. The intermediate noses 47 will then urge the collector ring 41 axially inwardly, thus collapsing the spring and causing inner 36 and outer 38 peripheral portions thereof to lie in a common plane. The levers 31 will pivot about the pins 32, and the outer ends 33 thereof will release the axial pressure previously held against the pressure plate bosses 34.

A central portion of the driven disc assembly 21 is shown in enlarged cross section in FIG. 3. The assembly 21 can be similar to that shown in U.S. Pat. No. 4,254,855 which assembly comprises rotary torque transmitting elements connected by a dampening unit designed to establish a resilient drive between the rotary elements. The damper unit is needed to tune the vehicle drive train system so that critical torsional vibrations are moved out of the operating speed range of the engine and the rest of the drive train. The hub 22 includes an integral radially outwardly extending annular flange 51. Positioned on opposite sides of the flange 51 are a pair of spaced apart outer annular covers 52. The support plate 23 with its friction facings 24 is located in the space provided between the outer covers 52. The above identified patent shows coaxial pairs of coil springs retained in openings provided in the covers 52 and the plate 23 to transmit drive between the covers 52 and the plate 23 and also provide resilient means for absorbing the torque of the engine, thereby eliminating chatter and rattle in the vehicle drive line. Secondary or auxiliary cover members are provided primarily to serve as drive means for the springs. The secondary cover members comprise a pair of flat, annular plates 53 located on opposite sides of the hub flange 51 and inside the outer or main covers 52. A series of rivets (not shown) extend through holes in the main covers 52, the secondary covers 53 and the hub flange 51 to secure these parts together as a unitary structure or subassembly. The secondary covers 53 are formed with stamped openings (not shown) for alignment with the spring openings in the main covers 52 and the support plate 23.

To substantially fill the axial space between the auxiliary covers 53, a plurality of flat annular reinforcing plates 54 are positioned on one side of the support plate 23. A plurality of fasteners such as rivets 55 securely attach the reinforcing plates 54 to the support plate 23 so that they operate as a unit or subassembly. The subassembly formed by the hub 22 and the inner 53 and outer 52 covers secured together will operate as a rotatable driven member of the clutch disc assembly 21. The rotatable drive member of the clutch disc assembly 21 is the subassembly formed by the support 23 and reinforcing 54 plates described above. To accommodate the limited rotation that occurs between the two subassemblies, circumferentially elongated openings 56 are provided in the covers 52 and 53 into which opposed heads of the rivets 55 project. The openings 56 permit the necessary clearance to the rivet heads as the coaxial springs (not shown) are being compressed to establish the resilient driving connection or to absorb shocks and vibrations in the vehicle drive system.

An end 57 of the rivet 55 closer to the flywheel 14 extends into one of the openings 56 but does not project beyond an outer surface of the associated outer cover 52. An opposite end 58 of the rivet 55 is enlarged and projects through another opening 56 beyond an outer surface of the associated outer cover 52 toward the pressure plate 20. As will be explained below, the head 58 of the rivet 55 engages elements of the damper adjusting apparatus according to the present invention.

Referring to FIGS. 1 through 3, an end 59 of the hub 22 which extends through the central opening in the pressure plate 20 is externally threaded. The end 59 also extends through a central aperture in an annular backing plate 60. The backing plate 60 has an annular facing material 61 affixed to a surface thereof for abutting the enlarged ends 58 of the rivets 55. A central aperture 62 is formed in the backing plate 60 which aperture is larger in diameter than the threaded end 59 such that the plate 60 can move axially with respect to the hub 22. The backing plate 60 is maintained on the threaded end 59 by a locking nut 63 having an internally threaded central aperture 64 formed therein for threadably engaging the threaded end 59. The locking nut 63 has a pair of spaced apart apertures 65 formed therein for engaging pins on a wrench. Trapped between the backing plate 60 and the locking nut 63 is a locking ring 66 formed as an annular plate. The ring 66 has a central aperture 67 formed therein larger in diameter than the threaded end 59 and an integral radially inwardly extending tab or tang 68. The tang 68 engages an axially extending slot or keyway 69 formed in an outer surface of the threaded end 59 of the hub 22. Thus, the locking ring 66 is coupled to rotate with the subassembly including the hub 22. If the tang 68 is substantially the width of the keyway 69 the locking ring 66 will remain in position with the hub 22 as the support plate subassembly begins to rotate. As an alternative, the keyway 69 can be formed wider than the tang 68 such that the locking ring 66 rotates with the support plate subassembly until the tang 68 engages a sidewall of the keyway 69 thereby delaying the loading.

The locking ring 66 also has a second tang 70 formed thereon, which tab extends radially outwardly and turns to extend in a direction generally parallel to the longitudinal axis of the hub 22 toward the closer outer cover 52. The second tang 70 engages a slot 71 formed in an outer periphery of the backing plate 60. Thus, the hub subassembly, the locking ring 66 and the backing plate 60 are coupled together for rotation. Positioned between the facing surfaces of the backing plate 60 and the locking ring 66 is a spring means such as a wave washer 72 having a central aperture 73 formed therein larger in diameter than the outer diameter of the end 59. As the locking nut 63 is threaded onto the threaded end 59 of the hub 22, the locking ring 66 will be forced toward the backing plate 60 thereby compressing the wave washer 72 which exerts an ever increasing axial load or pressure on the backing plate 60 to force it against the enlarged ends 58 of the rivets 55. The load applied by the wave washer 72 to the rivet ends 58 resists relative rotation between the two driven disc subassemblies. This load can be selectively adjusted at the initial assembly of the driven disc 21 and readjusted after wear has occurred by rotating the nut 63.

Figure 4:
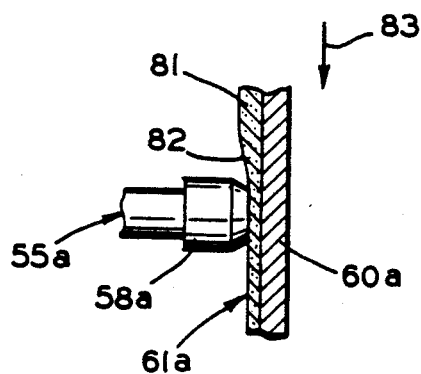
FIG. 4 is an enlarged fragmentary cross-sectional view of an alternate embodiment of the adjusting apparatus shown in FIG. 3.

In FIG. 4, there is shown an alternate embodiment of the present invention. A rivet 55a, a backing plate 60a and facing material 61a, which are similar to the rivet 55, the backing plate 60 and the facing material 61 of FIG. 3, are shown as if viewed from above. An enlarged end 58a of the rivet 55a abuts a facing surface of the facing material 61a. Adjacent to the head 58a, the facing material 61a has formed thereon a cam area 81 of increased thickness. The transition between the thinner portion of the facing material 61a and the thicker cam area 81 can be curved or sloped to provide a gradual transition as shown by a slope 82. As stated above, the hub 22, the outer cover 52 and the secondary cover 53 constitute one subassembly, while the support plate 23 and the reinforcing plates 54 constitute another subassembly, which subassemblies are relatively rotatable with respect to one another. Assuming that the backing plate 60a and the facing material 61a are driven to move in a direction of an arrow 83 with respect to the rivet 55a, the enlarged end 58a of the rivet 55a will engage the slope 82 and the cam area 81 thereby increasing the axial load or pressure on the support plate subassembly.

Figure 5:
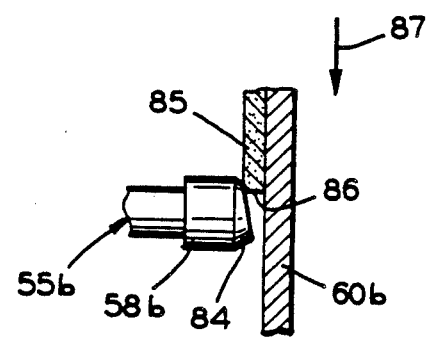
FIG. 5 is an enlarged fragmentary cross-sectional view of another alternate embodiment of the adjusting apparatus shown in FIG. 3.

A second alternate embodiment of the present invention is shown in FIG. 5 which is similar in orientation to FIG. 4. A rivet 55b has an enlarged end 58b. The end 58b has a sloped cam surface 84 which faces a backing plate 60b. Attached to the backing plate 60b and facing the rivet 55b is a facing material 85. The facing material 85 is semiannular or segmented. One segment has an edge 86 extending in a generally radial direction toward a central aperture (not shown) of the backing plate 60b. The edge 86 of the facing material 85 is positioned at a lower side of the sloped cam surface 84. Assuming that the backing plate 60b and the facing material 85 rotate in the direction of an arrow 87 with respect to the rivet 55b the edge 86 of the facing material 85 will be driven up the cam surface 84 to apply increasing axial pressure or load to the rivet 55b and an associated support plate and reinforcing plates.

Figure 6:
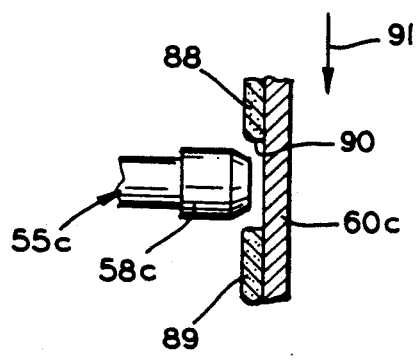
FIG. 6 is an enlarged fragmentary cross-sectional view of a further alternate embodiment of the adjusting apparatus shown in FIG. 3.

There is shown in FIG. 6 a third alternate embodiment of the present invention. A backing plate 60c has a plurality of semiannular segments of facing material attached thereto such as a segment 88 spaced from a segment 89. A rivot 55c having an enlarged end 58c is positioned adjacent the backing plate 60c in the gap between the facing material segments 88 and 89. The segment 88 has an edge 90 which extends in a generally radial direction with respect to the backing plate 60c toward a central aperture (not shown) thereof. When the backing plate 60c and the facing material segments 88 and 89 rotate in a direction of an arrow 91 with respect to the rivet 55c, the edge 90 of the facing material segment 88 will come into contact with the enlarged end 58c of the rivet 55c thereby applying axial load to the support plate subassembly Thus, a predetermined amount of relative rotation will occur before a load is applied which is similar to the above-described embodiment wherein the width of the keyway 69 is wider than the width of the tang 68.

Figure 7:
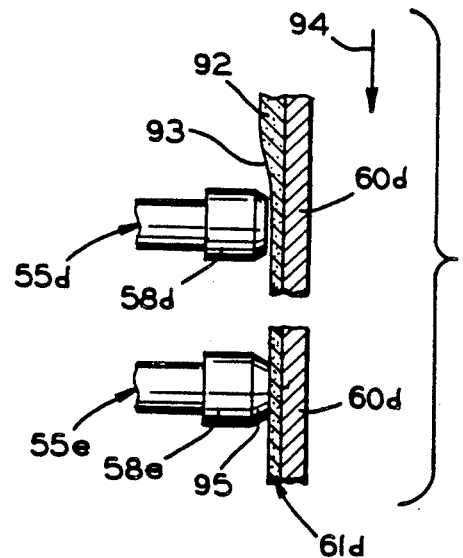
FIG. 7 is an enlarged fragmentary cross-sectional view of yet another alternate embodiment of the adjusting apparatus shown in FIG. 3.

There is shown in FIG. 7 a fourth alternate embodiment of the present invention. A rivet 55d having an enlarged end 58d is positioned adjacent a backing plate 60d having a facing material 61d attached thereto. The facing material 61d has an increased thickness cam area 92 with a slope 93 forming a transition surface between the two thicknesses of facing material. When the backing plate 60d and facing material 61d rotate in a direction indicated by an arrow 94 with respect to the rivet 55d, the enlarged end 58d will engage the slope 93 and increasing axial load will be applied through the rivet 55d to the associated support plate subassembly.

Alternating with a first plurality of the rivets 55d are a second plurality of rivets 55e each having an enlarged end 58e. The enlarged end 58e has an increased thickness contact surface 95 as compared to the rivet 55d. Thus, the contact surface 95 abuts the facing surface of the facing material 61d such that a pressure is applied to the support plate subassembly through the rivets 55e. As the backing plate 60d and the facing material 61d move in the direction of the arrow 94, the enlarged ends 58d of the rivets 55d will engage the corresponding ones of the slopes 93 to apply additional and increasing pressure. Thus, the rivets 55d provide a second stage of pressure which can be selectively applied at any angle of rotation by adjusting the spacing between the rivets 55d and the associated slopes 93.

The present invention concerns a clutch driven disc assembly comprising a hub, a support plate mounted on and rotatable relative to said hub, at least one reinforcing plate mounted on and rotatable relative said hub, a plurality of circumferentially spaced fasteners connecting together said support plate and said reinforcing plate, and a backing plate mounted on said hub and abutting said fasteners for applying an axial load through said fasteners to said support plate and said reinforcing plate. The load is selectively adjustable through a threaded locking nut and wave washer mounted on the hub. Segmented facing material on the backing plate can be used to delay the application of the load. Camming surfaces on the facing material or on the fasteners can be used to gradually increase the load.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A clutch driven disc assembly comprising:
   a hub;
   a support plate mounted on and rotatable relative to said hub;
   at least one reinforcing plate mounted on and rotatable relative said hub;
   a plurality of circumferentially spaced fasteners connecting together said support plate and said reinforcing plate; and
   a backing plate mounted on said hub and abutting said fasteners for applying an axial load through said fasteners to said support plate and said reinforcing plate.

2. The apparatus according to claim 1 including a pair of spaced apart outer covers attached to said hub on opposite sides of said support plate and wherein said fasteners each have one end extending through an associated opening formed in one of said covers into abutment with said backing plate.

3. The apparatus according to claim 1 wherein said fasteners are rivets.

4. The apparatus according to claim 1 including a facing material attached to said backing plate and abutting said fasteners.

5. The apparatus according to claim 1 including means for preventing relative rotation between said hub and said backing plate.

6. The apparatus according to claim 5 wherein said means for preventing relative rotation includes a locking ring mounted on said hub, said locking ring having a first tang formed thereon engaging a keyway formed in said hub and a second tang formed thereon engaging a slot formed in said backing plate.

7. The apparatus according to claim 6 including a locking nut threadably engaging said hub for axially adjusting the positions of said locking ring and said backing plate with respect to said fasteners.

8. The apparatus according to claim 7 including a spring means positioned between said backing plate and said locking ring for applying an axial load to said fasteners through said backing plate.

9. The apparatus according to claim 8 wherein said spring means is a wave washer.

10. The apparatus according to claim 5 wherein said means for preventing relative rotation between said hub and said backing plate includes a locking ring mounted on said hub, said locking ring having a first tang formed thereon engaging a keyway formed in said hub and a second tang formed thereon engaging a slot formed in said backing plate, and said keyway being wider than said first tang for permitting limited relative rotation between said hub and said backing plate.

11. The apparatus according to claim 1 including a facing material attached to said backing plate and abutting said fasteners, said facing material having an increased thickness area adjacent each of said fasteners whereby relative rotation between said backing plate and said fasteners to abut said fasteners with associated ones of said increased thickness areas increases the axial load applied through said fasteners to said support plate and said reinforcing plate.

12. The apparatus according to claim 1 including a facing material attached to said backing plate and having a plurality of semiannular segments, each said segment having an edge abutting one end of a cam surface formed an associated one of said fasteners whereby relative rotation between said backing plate and said fasteners to move said edge of said fasteners toward an opposite end of said cam surface increases the axial load applied through said fasteners to said support plate and said reinforcing plate.

13. The apparatus according to claim 1 including a facing material attached to said backing plate and having a plurality of semiannular circumferentially spaced apart segments, each said segment having an edge spaced a predetermined distance from an associated one of said fasteners whereby relative rotation between said backing plate and said fasteners to move said edge of said segment into abutment with said associated one fastener applies an axial load through said fasteners to said support plate and said reinforcing plate.

14. The apparatus according to claim 1 including a facing material attached to said backing plate and abutting a first plurality of said fasteners and spaced from a second plurality of said fasteners, said facing material having an increased thickness area adjacent each fastener of said second plurality of said fasteners whereby relative rotation between said backing plate and said fasteners to abut said fasteners of said second plurality of fasteners with associated ones of said increased thickness areas increases the axial load applied through said fasteners to said support plate and said reinforcing plate.

15. A clutch driven disc assembly comprising:
a hub;
a pair of spaced apart outer covers attached to said hub;
a support plate positioned between said covers and mounted on and rotatable relative to said hub;
at least one reinforcing plate mounted on and rotatable relative said hub;
a plurality of circumferentially spaced fasteners connecting together said support plate and said reinforcing plate, each of said fasteners having one end extending through an associated aperture formed in one of said covers; and
a backing plate mounted on said hub and abutting said one end of said fasteners for applying an axial load through said fasteners to said support plate and said reinforcing plate.

16. The apparatus according to claim 15 including a locking ring mounted on said hub, said locking ring having a first tang formed thereon engaging a keyway formed in said hub and a second tang formed thereon engaging a slot formed in said backing plate, a locking nut threadably engaging said hub for axially adjusting the positions of said locking ring and said backing plate with respect to said fasteners, and a spring means positioned between said backing plate and said locking ring for applying an axial load to said fasteners through said backing plate.

17. The apparatus according to claim 16 wherein said spring means is a wave washer.

18. The apparatus according to claim 15 wherein said fasteners are rivets having enlarged heads at said one end abutting said backing plate.

19. A clutch driven disc assembly comprising:
a hub;
a support plate mounted on and rotatable relative to said hub;
a pair of reinforcing plates mounted on and rotatable relative said hub;
a plurality of circumferentially spaced fasteners connecting together said support plate and said reinforcing plate in a subassembly;
a pair of spaced apart outer covers attached to said hub on opposite sides of said subassembly;
a backing plate mounted on said hub and abutting said fasteners for applying an axial load through said fasteners to said subassembly; and
means for selectively adjusting the axial load.

20. The apparatus according to claim 19 wherein said means for selectively adjusting includes a locking ring mounted on said hub, said locking ring having a first tang formed thereon engaging a keyway formed in said hub and a second tang formed thereon engaging a slot formed in said backing plate a locking nut threadably engaging said hub for axially adjusting the positions of said locking ring and said backing plate with respect to said fasteners, and a spring means positioned between said backing plate and said locking ring for applying the axial load to said fasteners through said backing plate.

* * * * *